G. H. JONES.
FRAME FOR AUTOMOBILES.
APPLICATION FILED APR. 25, 1910.
1,047,650.
Patented Dec. 17, 1912.
2 SHEETS—SHEET 2.
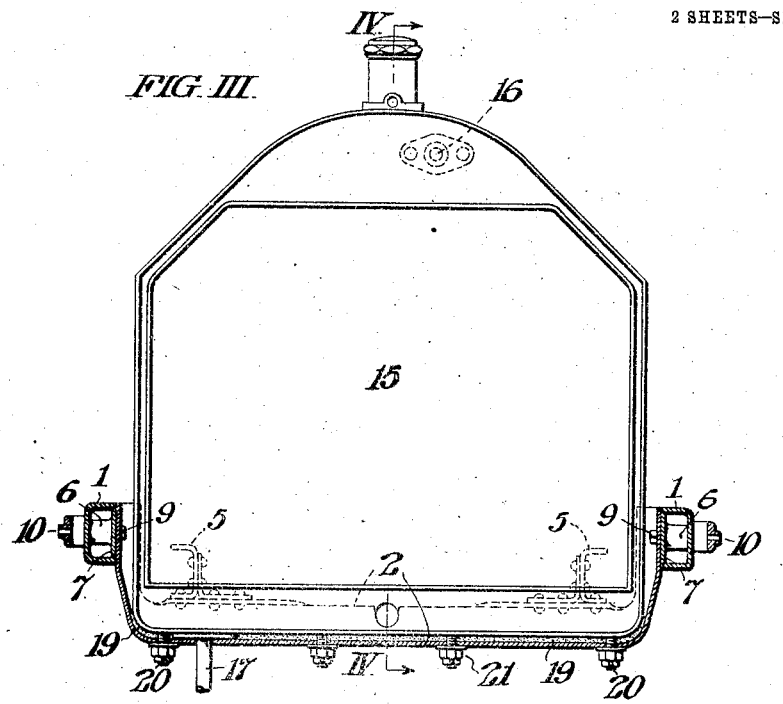
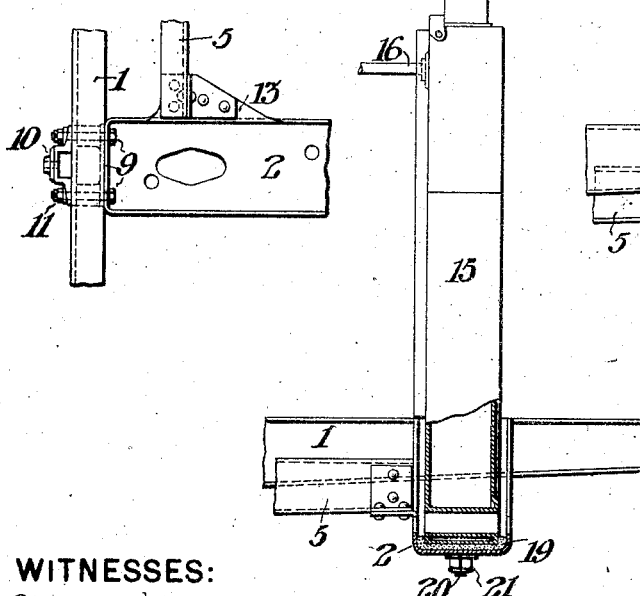
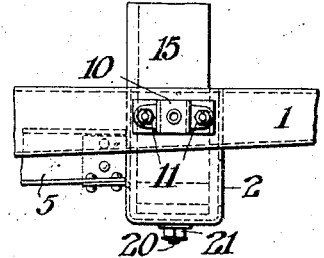
WITNESSES:
Philip W. Vessey.
R. Schleicher.
INVENTOR:
GEORGE HILL JONES,
by Arthur E. Paige,
Attorney.

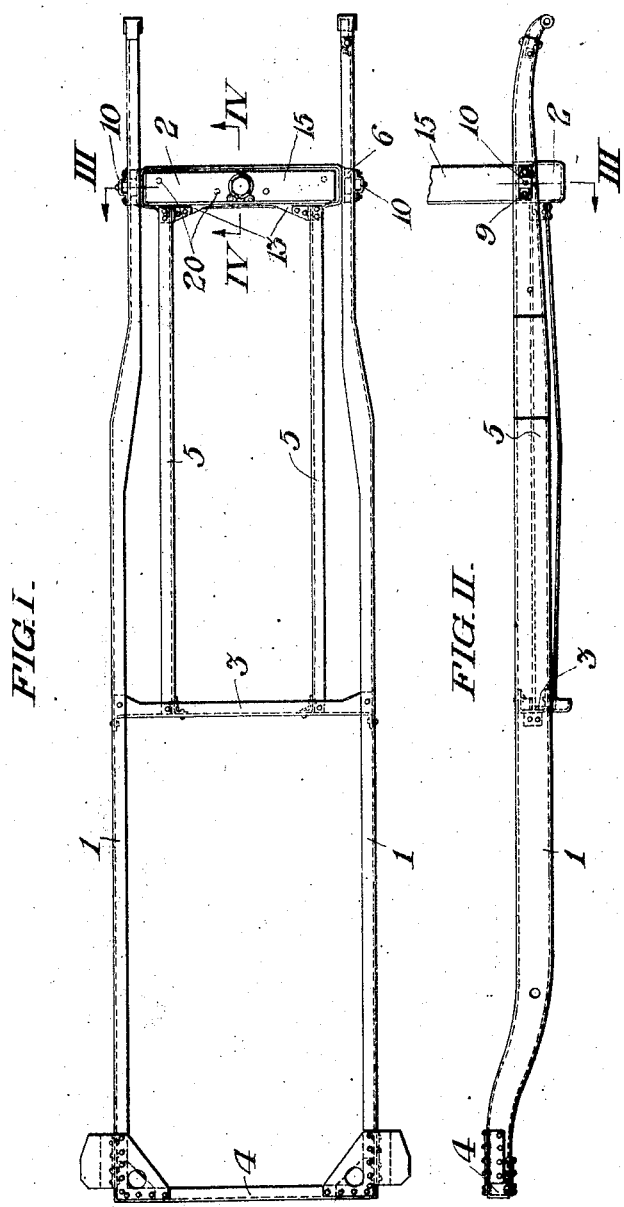

UNITED STATES PATENT OFFICE.

GEORGE HILL JONES, OF ALDAN, PENNSYLVANIA.

FRAME FOR AUTOMOBILES.

1,047,650.  Specification of Letters Patent.  Patented Dec. 17, 1912.

Application filed April 25, 1910. Serial No. 557,311.

*To all whom it may concern:*

Be it known that I, GEORGE HILL JONES, of Aldan, in the State of Pennsylvania, have invented a certain new and useful Improvement in Frames for Automobiles, whereof the following is a specification, reference being had to the accompanying drawings.

It is the object of my invention to provide an automobile frame capable of supporting a radiator while permitting relative movement thereof sufficient to compensate for the usual distortion of the frame without producing destructive stresses upon the radiator and, as hereinafter described, my invention includes an automobile frame comprising a front cross-bar of U shaped cross section in which the radiator sits upon a felt cushion and is secured by bolts extending vertically through the horizontal base web of said cross-bar, thus dispensing with said frame brackets heretofore employed. Moreover, my invention includes such construction and arrangement of said cross-bar at its junction with the side reaches of the frame that the bolts securing it also secure the brackets for the mud guards upon the exterior of said reaches; eliminating the bolts heretofore required for mud guard brackets, and, the several openings through the side reaches heretofore required for them.

My invention includes the various novel features of construction and arrangement hereinafter more definitely specified.

In the drawings: Figure I is a plan view of a frame conveniently embodying my invention. Fig. II is a side elevation of said frame. Fig. III is a transverse sectional view, taken on the line III, III in Figs. I and II. Fig. IV is a longitudinal sectional view, taken on the line IV, IV in Figs. I and III. Fig. V is a fragmentary plan view showing the means connecting said cross-bar with one of the side reaches and mud guard brackets. Fig. VI is a side elevation of the parts shown in Fig. V.

In said figures, the frame includes the outer side bars or longitudinal reaches 1, the front cross-bar 2, the middle cross-bar 3, the rear cross-bar 4 and the intermediate longitudinal bars or reaches 5 extending from said front cross-bar 2 to said middle cross-bar 3.

Spacers 6 are inserted in said side bars 1 at their junctions with said front cross-bar 2 so as to present their flanges 7 flush with the inner edges of said side bars 1 against said cross-bar 2, and the latter is rigidly connected with said side bars 1 by the bolts 9 which extend through said spacers 6 and through the mud guard brackets 10 and are provided with nuts 11 exterior to said brackets. Said cross-bar 2 has the rearwardly extending horizontal flanges 13 to which said intermediate bars 5 are rigidly connected, conveniently by the rivets indicated.

The radiator 15 which is included in the water cooling system of the automobile motor, by the pipes 16 and 17, sits in said cross-bar 2 upon the felt cushion 19, being provided with the four stud bolts 20 which extend vertically through said cushion and cross-bar and are provided with the nuts 21 beneath the latter.

The arrangement above described is such that said frame is capable of yielding slightly under the stresses to which it is subjected during the operation of the automobile, without subjecting said radiator or its connections to any detrimental stress. Moreover, the front cross-bar and the mud guard brackets are secured in rigid connection with the frame with the minimum number of openings through the latter, the same bolts being employed to rigidly connect said cross-bar and said brackets to said frame members 1. However, it is to be understood that other means may be employed to connect the members of the frame, without departing from the essential feature of my invention which consists in interposing a flexible medium between the frame and the radiator to support the latter. Therefore, I do not desire to limit myself to the precise details of construction and arrangement herein set forth, as it is obvious that various modifications may be made therein without departing from the essential features of my invention as defined in the appended claims.

I claim:—

1. In an automobile, the combination with outer longitudinal frame bars; of a front cross bar connecting said outer longitudinal bars; mud guard brackets fitted upon the outer sides of said longitudinal bars in registry with said front cross bar; spacers in said longitudinal bars having flanges presented against said cross bar; and, bolts extending through said cross bar, longitudinal bars, spacers and brackets.

2. In an automobile, the combination with longitudinal frame bars; of a channel cross bar connecting said longitudinal bars having its ends extending vertically in connection with said longitudinal bars and having its parallel flanges turned inwardly at said ends and upwardly intermediate thereof; a cushion in the bottom of said cross bar between the upwardly extending flanges thereof; a radiator extending into said cross bar between said flanges and sitting upon said cushion; bolts extending vertically from the base of said radiator through the base web of said cross bar; and, nuts on said bolts.

3. In an automobile, the combination with longitudinal frame bars; of a channel cross bar connecting said longitudinal bars having its ends extending vertically in connection with said longitudinal bars and having its parallel flanges turned inwardly at said ends and upwardly intermediate thereof; a cushion in the bottom of said cross bar between the upwardly extending flanges thereof; a radiator extending into said cross bar between said flanges and sitting upon said cushion; and, means connecting said radiator with said cross bar.

4. In an automobile, the combination with longitudinal frame bars; of a channel cross bar connecting said longitudinal bars having its ends extending vertically in connection with said longitudinal bars and having its parallel flanges turned upwardly; a cushion in the bottom of said cross bar between the upwardly extending flanges thereof; a radiator extending into said cross bar between said flanges and sitting upon said cushion; and, means connecting said radiator with said cross bar.

5. In an automobile, the combination with outer longitudinal channel frame bars; of intermediate longitudinal channel bars; and, a front channel crossbar connecting said outer longitudinal bars and having its parallel flanges turned inwardly adjoining said outer longitudinal bars and turned outwardly intermediate thereof, and, having horizontal flanges extending rearwardly in connection with said intermediate channel bars.

In testimony whereof, I have hereunto signed my name at Philadelphia, Pennsylvania, this twentieth day of April, 1910.

GEORGE HILL JONES.

Witnesses:
ARTHUR E. LAIGE,
FRANZ HODER.